United States Patent [19]

Sullivan

[11] 4,298,875
[45] Nov. 3, 1981

[54] AIRCRAFT COLLISION AVOIDANCE SYSTEM

[75] Inventor: Roger M. Sullivan, Colorado Springs, Colo.

[73] Assignees: Leo K. O'Brien; Thomas B. Carney, both of Colorado Springs, Colo.

[21] Appl. No.: 9,829

[22] Filed: Feb. 2, 1979

[51] Int. Cl.³ .......................... G01S 3/02; G01S 1/10
[52] U.S. Cl. ............................. 343/112 CA; 343/110
[58] Field of Search ............. 343/112 CA, 110, 16 R, 343/7.9; 340/27 NA; 364/461

[56] References Cited

U.S. PATENT DOCUMENTS

| | | | |
|---|---|---|---|
| 3,611,371 | 10/1971 | Morse | 343/112 CA |
| 3,611,385 | 10/1971 | McHenry | 343/112 CA |
| 3,653,049 | 3/1972 | Thayer et al. | 343/112 CA |
| 3,725,934 | 4/1973 | Ludlow | 343/112 CA |
| 4,104,638 | 8/1978 | Middleton | 343/112 CA |

*Primary Examiner*—Stephen C. Buczinski
*Attorney, Agent, or Firm*—Schwartz, Jeffery, Schwaab, Mack, Blumenthal & Koch

[57] ABSTRACT

The system provides each equipped given aircraft with an indication of the presence of a similarly equipped intruder aircraft. Various zones are established about the given and intruder crafts and the indication provided tells each pilot when two of these zones overlap. The zones are established by positioning a plurality of transmit/receive antennae about the body of each craft. The dispersion angle and range of each antenna defines a separate one of the zones. Each antenna transmits a signal coded to indicate the location of its zone upon its respective aircraft, and is equipped to receive similarly coded signals transmitted by the other aircraft. These signals are decoded to give an indication of the zone of the intruder aircraft nearest the zone defined by the receiving antenna of the given aircraft. This information is displayed on a cockpit mounted display panel to provide an imminent collision warning which also shows the relative positions of the two aircraft. Transmitters can also be mounted on mountain peaks or other obstacles to indicate their presence to any aircraft in dangerous proximity thereto.

15 Claims, 6 Drawing Figures

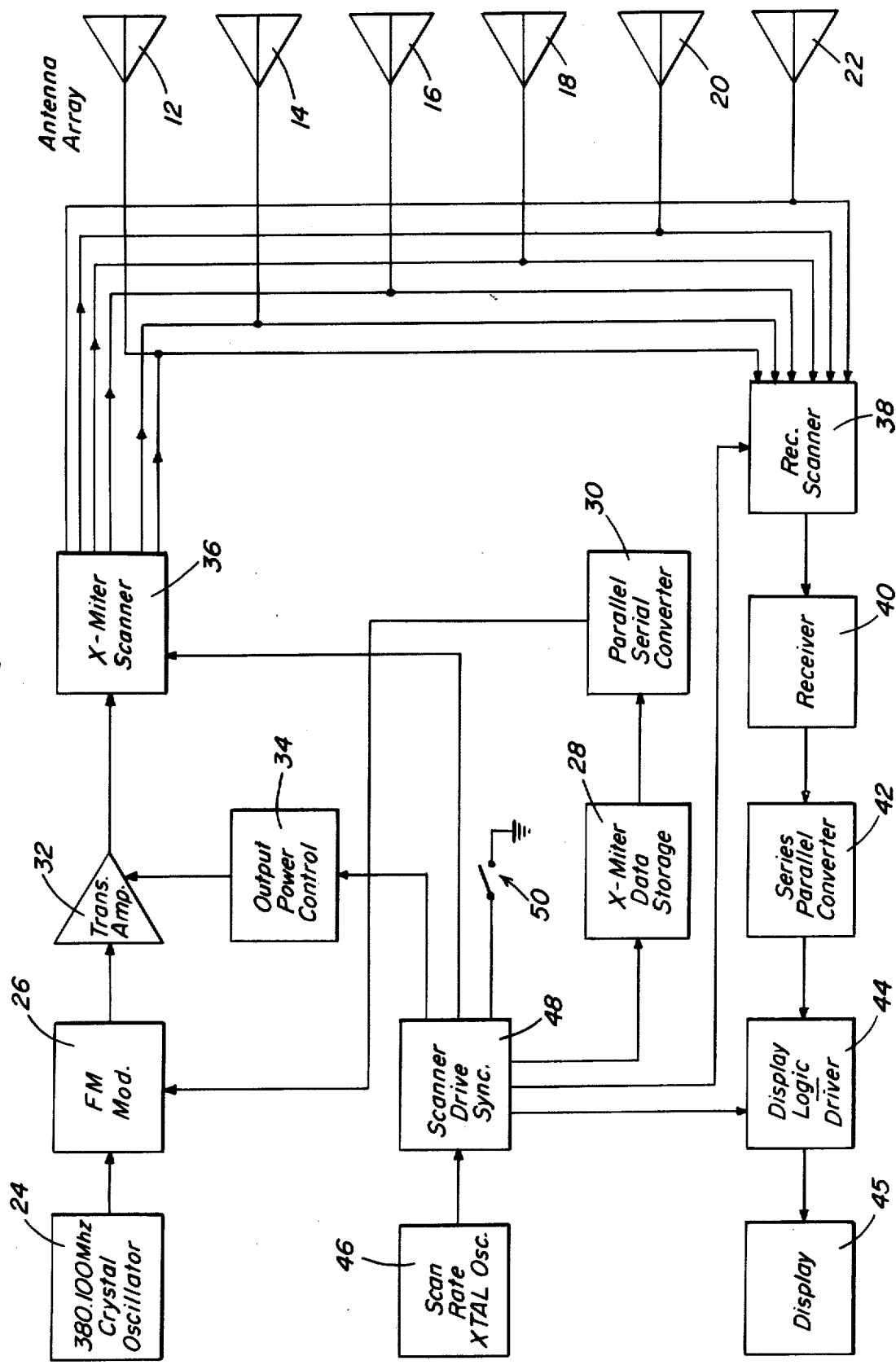

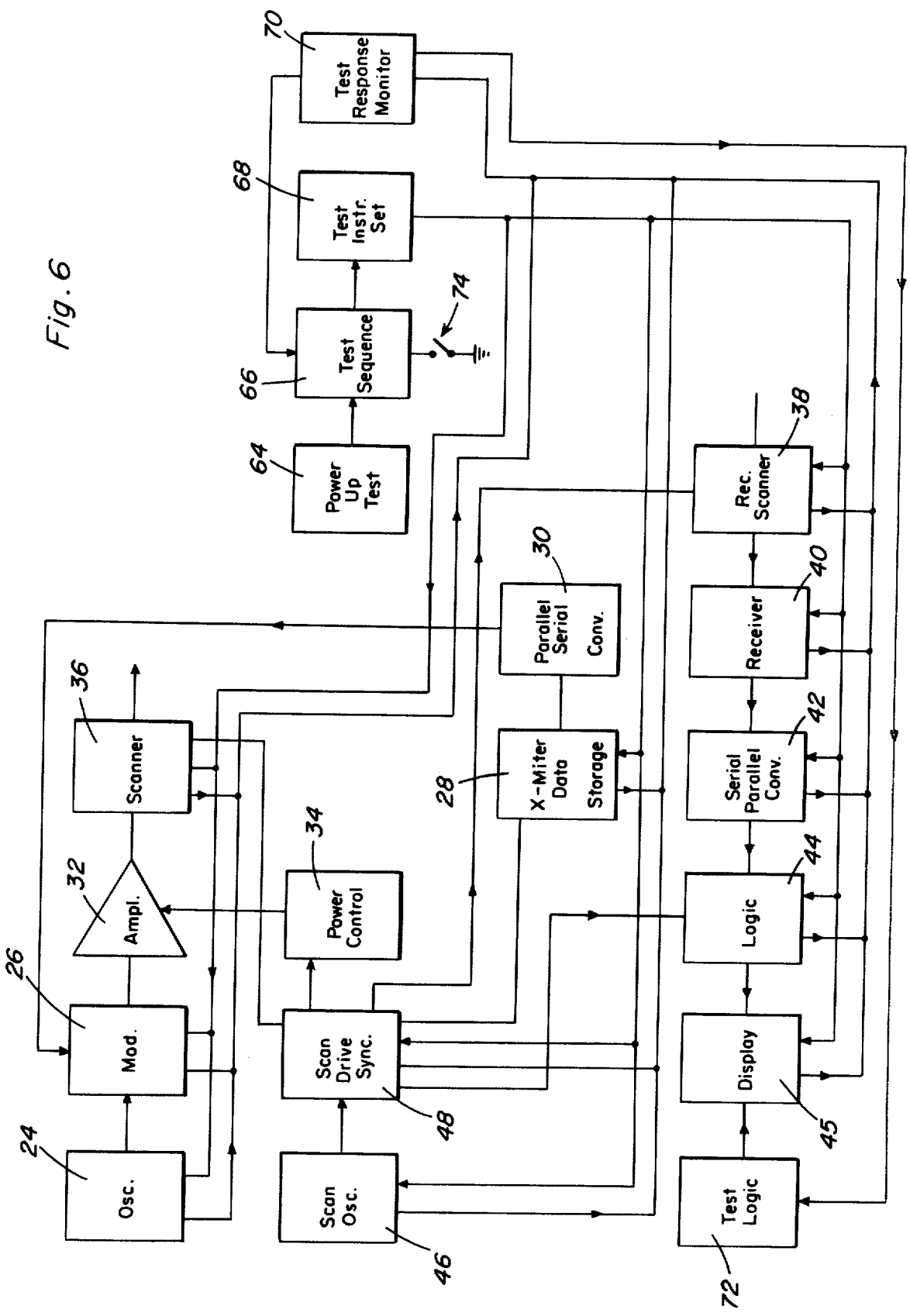

AIRCRAFT COLLISION AVOIDANCE SYSTEM

BACKGROUND OF THE INVENTION

1. Field of the Invention

This invention relates to a cooperative type vehicle collision avoidance system and particularly relates to such systems as can be used upon aircraft for the prevention of mid-air collisions.

2. Description of the Prior Art

Recent aircraft collisions have focused national attention on the need for reliable collision avoidance equipment which is simple, safe and reliable. Presently available collision avoidance systems require a sizable amount of complex equipment which must be constantly maintained. Even with adequate maintenance, such systems are subject to failure causing a rash of whistles and buzzers to go constantly in the plane cockpits creating disturbing distractions to the aircraft pilots.

One example of such a complex system is that shown in U.S. Pat. No. 3,611,385, which incorporates the use of light generator and detector systems. As well as being complex, the response of such systems deteriorates during fog, rain and snow conditions. Also, such systems are subject to confusion by reception of signals from ground base light sources such as reflected highways, vehicle lights and radio and television antennas that are equipped with strobe lights. U.S. Pat. No. 3,708,671 shows another light generator and detector system for indicating the direction of intruder aircraft approach. This system is also subject to deterioration during rain, fog and snow conditions and again is subject to inadvertent signalling due to ground base light sources. U.S. Pat. No. 3,736,559 and U.S. Pat. No. 3,846,746 are similarly deficient in that they also rely upon light generators and detectors for signalling the presence of intruder aircraft. U.S. Pat. No. 4,104,638 shows an anti-collision radio system wherein a conventional automatic direction finder ascertains the bearing of an aicraft transmitting a modulated tone or tones. The use of multiple frequencies as suggested by this system in a collision avoidance application is impractical. Furthermore, the display interpretation time as disclosed is prohibitively long. Also, the aircraft type discrimination as disclosed is complex and is therefore subject to various faults. U.S. Pat. No. 3,310,806 shows a complex collision prevention system wherein an aircraft transmits signals indicative of its altitude and course and another aircraft receives these signals and computes the relative courses of the two aircraft. The complexity of such a system makes it impractical in terms of both cost and maintenance. U.S. Pat. No. 3,653,049 shows a collision warning system wherein a host aircraft detects the radio frequency transmissions from an intruder aircraft in its vicinity. A multi-segment antenna provides information as to the compass quadrant of the intruder aircraft and the intensity of the received signal is monitored to provide an indication of closure rates between the two aircrafts. The primary deficiency of this system is in that the intruder aircraft must be constantly transmitting a signal in order for the collision warning system to be effective.

SUMMARY OF THE INVENTION

Each aircraft is equipped with six transmit/receive antennae positioned about the aircraft for defining six non-overlapping zones. The antennae are sequentially energized and transmit individual coded signals indicative of the location of each antenna upon the aircraft body. The locations of the antennae upon the aircraft body are standardized and include one antenna on each wing tip, one antenna on the aircraft nose, one on the aircraft tail, one on the top of the fuselage and one at the bottom of the fuselage. A display screen is located within the cockpit and provides a visual indication of the aircraft and the six zones established by the antennae. When a similarly equipped aircraft comes within range of the first mentioned aircraft, a signal is initially received by one of the antennae on the first aircraft. This signal is decoded to give an indication of the zone on the second aircraft from which the signal was emitted. The display panel then gives the pilot an indication of the zone on the first aircraft which received the signal and also provides an indication of the zone on the second aircraft from which the signal was transmitted. Thus the pilot has a simplified indication of the relative position of the two aircraft in time capable to allow him to initiate evasive maneuvers. The system is also provided with a built-in test routine which is effective to show that the avoidance mechanism is in proper working condition.

Accordingly, an object of the present invention is to provide a collision avoidance system which is relatively simple, safe and effective for providing the same degree of protection to aircraft in both visual flight rule and instrument flight rule conditions.

A further object of the present invention is to provide a collision avoidance system wherein inputs to the systems are limited to data from other aircraft that are in such proximity as to constitute a threat of collision, and yet a sufficient distance so as to minimize the need for a violent evasive maneuver.

A still further object of the present invention is to provide a collision avoidance system which includes a self-monitoring circuit for providing automatic or manually initiated monitoring of the various anti-collision system components to insure proper functioning of the overall system.

One additional object of the present invention is to provide a collision avoidance system which can receive coded signals from stationary obstacles such as mountain peaks and the like, to provide an indication of the approach of the equipped vehicle within dangerous proximity to the obstacle.

These, together with other objects and advantages which will become subsequently apparent, reside in the details of construction and operation as more fully hereinafter described and claimed, reference being had to the accompanying drawings forming a part hereof, wherein like numerals refer to like parts.

BRIEF DESCRIPTION OF THE DRAWINGS

FIG. 5 is a block diagram representation of the transmit and receive section of the collision avoidance system.

FIG. 6 is a block diagram representation of the error monitoring circuitry of the collision avoidance system.

DESCRIPTION OF THE PREFERRED EMBODIMENT

Figure 1:
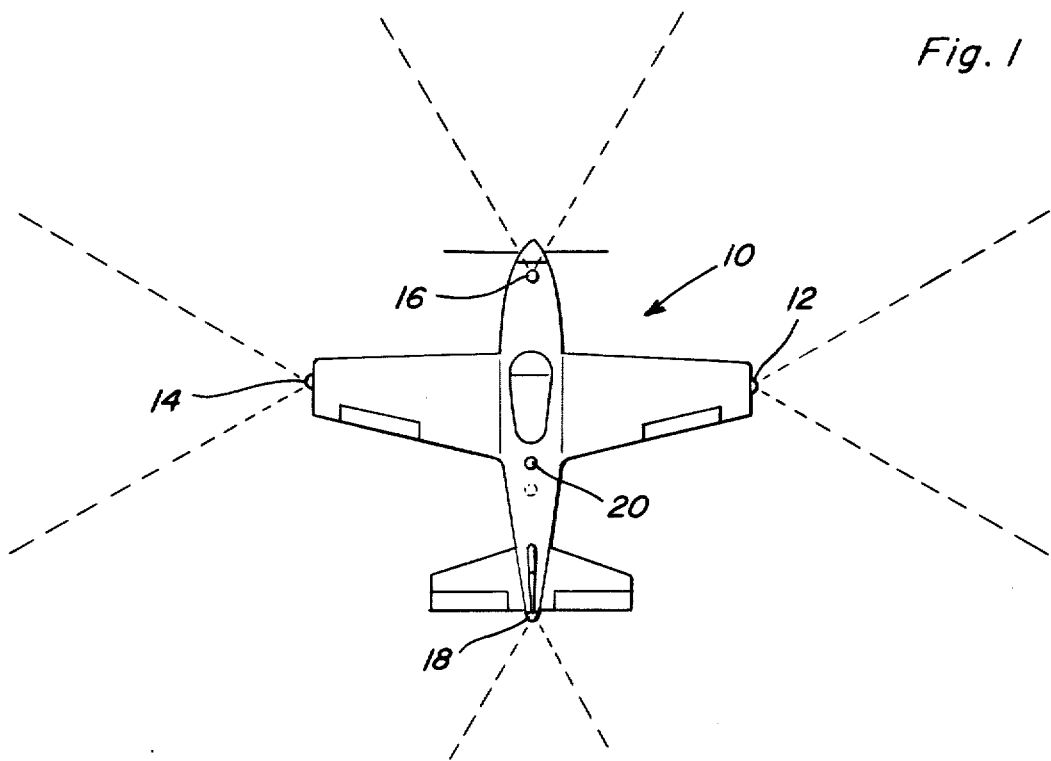
FIG. 1 is a plan view of an aircraft equipped with the collision avoidance system of the present invention.
Figure 2:
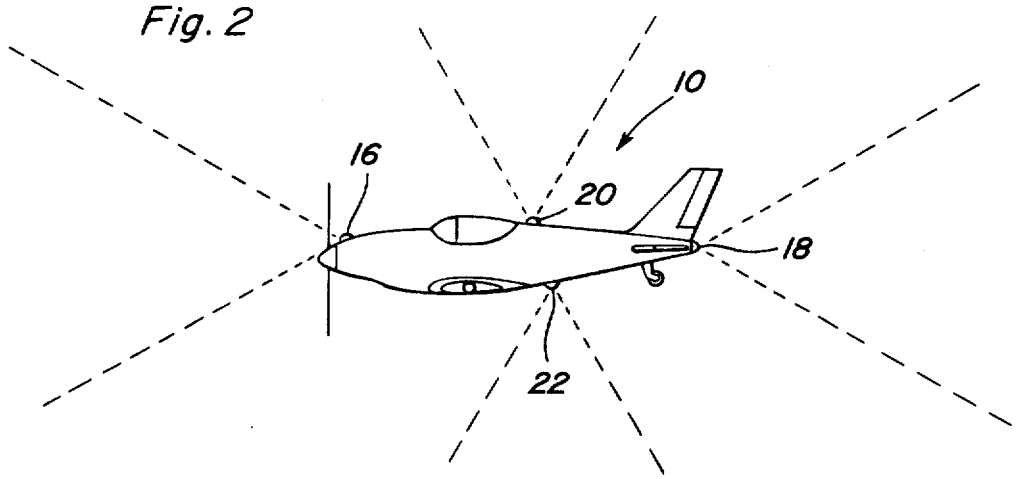
FIG. 2 is a side elevational view of the aircraft of FIG. 1.

Now with reference to the drawings, the aircraft collision avoidance system of the present invention will be set forth in detail. With particular reference to FIGS. 1 and 2, it will be seen that a typical aircraft 10 is provided with a plurality of antennae located at predetermined positions on the aircraft. The antennae include a right side antenna 12, a left side antenna 14, a nose antenna 16, a tail antenna 18, a top antenna 20 and a bottom antenna 22. Each antenna has both transmit and receive capability and is configured as a directional, miniature disk antenna of the fractional wave length type. As can be seen in FIGS. 1 and 2, the radiation pattern of each antenna is depicted by the phantom lines radiating outwardly from the respective antennae to define the zone covered by that particular antenna. The six antenna system provides total three axis coverage emanating outward from the aircraft producing a territorial safe zone around the entire aircraft. Of course, it will be evident that the number of antennae may be varied in accordance with the desired number of zones to be established about the aircraft so long as one particular pattern of antennae distribution is used on all aircraft employing this system. Also, it should be noted that the radiation/reception pattern of each antenna is such that the various zones do not overlap and, in fact, as shown, a small dead zone exists between the zones defined by each antenna. By limiting the antenna zones in this manner, it is possible to reduce the number of signals received by each intruder aircraft thus establishing the intruder aircraft position more readily. However, the antenna radiation zones can be varied as desired as will become apparent hereinafter.

Now, with reference to FIG. 5, the block diagram of the collision avoidance system transmit and receive circuitry will be described. Element 24 is a crystal oscillator used for providing the basic transmit frequency, within the range of 200–500 MHz. This frequency is chosen and would be the common carrier frequency assigned for use with all collision avoidance systems built in accordance with the present invention. In selecting a high frequency for the carrier, the potential for interference is reduced and also the basic range capability is increased allowing the use of a lower power transmitter with the attendant cost savings and weight reduction. Also, the use of such a high frequency would offer no interference with other onboard equipment. The carrier wave is passed to frequency modulator 26 which modulates the carrier in accordance with information received from data storage block 28. Data storage block 28 consists of hard wired memory registers which contain coded data representations for the aircraft nose, left wing, right wing, tail, top and bottom. The coded data is maintained in parallel form in the registers and passed through parallel to serial converter 30 prior to modulating the carrier wave in modulator 26. The modulated signal is amplified in transmitter amplifier 32, the maximum output of which is set at approximately 100 mW. The amplified signal is passed through transmitter scanner 36 which directs the modulated signal to the appropriate one of the antennae. At the same time, transmitter scanner 36 shields the other antennas in the array from self-generated radio frequency energy. Receiver scanner 38 is also attached to antennae 12, 14, 16, 18, 20 and 22. Receiver scanner 38 sequentially samples each antenna and transmits any received signal to receiver 40. Receiver 40 is a low sensitivity strike the specific frequency 380.1 MHz FM receiver designed to receive and interpret serial digital information only. Receiver 40 demodulates the information and passes it to serial to parallel converter 42 which transforms the serial data to parallel and passes the information on to display logic 44. Display logic 44 contains registers which also store parallel codes representing the various antenna positions. The received decoded signal is compared to each of these codes to determine the zone of origin of the received signal. Also, the display logic has an antenna memory which is sequenced along with scanner 38 to give a representation of the antenna which was active in receiving the decoded signal. The display logic passes this information to display 45 which provides a visual indication of both the zone of origin of the received signal and the antenna active during reception of the signal. This information is used by the pilot to interpret the relative positions of both his aircraft and the intruder aircraft.

Scan rate oscillator 46 provides the timing function for the total system. The output of the scan rate oscillator drives the scanner drive synchronizer 48 which coordinates the functioning of the transmitter scanner 36, receiver scanner 38, transmitter data storage 28 and display logic driver 44. At the same time, the scanner drive synchronizer 48, controls the output power level of amplifier 32 through power control 34. A switch 50 is connected to the scanner drive synchronizer 48 for setting the power output of transmitter scanner 36 at its maximum of 100 mW when the aircraft is above the ground. During take off and landing, switch 50 is activated to set the power output of scanner 36 at a minimum so as not to interfer with aircraft on the ground. Operation of switch 50 also serves to remove bottom antenna 22 from the transmitter and receiver patterns such that antenna 22 will not interact with aircraft on the ground during take off and landing procedures.

Figure 4:
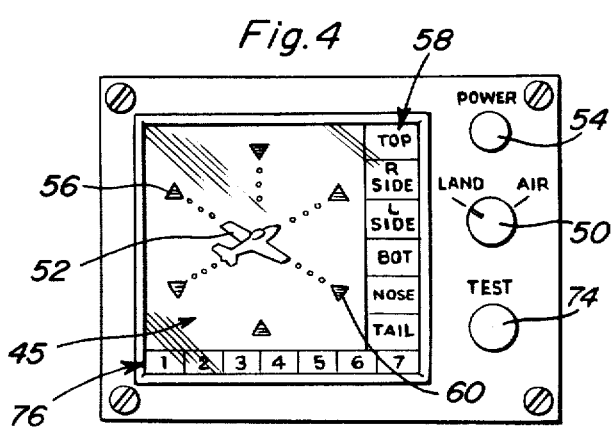
FIG. 4 is a front elevational view of the module of FIG. 3 depicting the display portion of the module.

In operation, the display 45, as seen in FIG. 4, will provide a lighted image of the aircraft, shown at 52. When the aircraft is taking off, the power button 54 is depressed sending power to the system of FIG. 5. Switch 50 is placed in the land position to remove antenna 22 from its operative mode and set transmitter amplifier 32 at its lower power setting. At the same time, scan rate oscillator 46 and the carrier frequency oscillator 24 begin operation. As the plane takes off, the scan rate oscillator 46, through the scanner drive synchronizer 48, causes the first antenna, antenna 12, to be connected to transmitter amplifier 32. Scanner drive synchronizer also activates the first register of data storage block 28, the data from which is passed through parallel to serial converter 30 to FM modulator 26. The drive synchronizer could also set the sensitivity of receiver 40 at a minimum to further reduce the possibility of an inadvertent alarm due to ground based aircraft, if desired. At this time, the FM modulated signal is transmitted via antenna 12. At the same time, the receiver scanner is set to connect antenna 14, located laterally opposite antenna 12, to receiver 40. Logic driver 44 is set through drive schronizer 48 to enable the lighting of LED 56 on display panel 46, LED 56 being representative of the antenna zone defined by antenna 14. Any signal received will be channeled through scanner 38 and compared to the stored data of display logic 44 wherein the decoded signal zone of origination will be determined. The driver 44 will then cause the appropriate one of the light panel 58 to be lit. For example, if the intruder plane's nose antena signal has been received, the light marked NOSE of light panel 58 will be lit. At the same time, LED 56 will be lit and an audible signal may be sounded to alert the piot of the imminent collision situation. The pilot will thereby be informed that an intruder aircraft is approaching his left wing.

The next pulse emitted from scanner rate oscillator 46 sequences the transmitter scanner 36, receiver scanner 38, transmitter data storage 28 and display logic driver 44 so that antenna 14 is now in the transmit circuit, an antenna 12 is now in the receive circuit. Upon reception of an intruder's signal, the appropriate light display of 58 will be lit as well as LED 60 on display 45, indicating the position of the receiving antenna. Scanner rate oscillator 46 continues the sequencing process with antennae oriented on opposite positions on the aircraft being simultaneously connected to the transmit/receiver circuits of the system. Once the aircraft is well above the ground, the switch 50 can be changed to the AIR position thereby allowing antenna 22 to be sequenced along the other antennae. At the same time, scanner drive synchronizer control 48 will increase the output of amplifier 32 through output power control 34 to its maximum level of 100 mW. Scanner oscillator 46 should be set to provide a scan rate of between several hundred and several thousand cycles per second. In this manner, a fairly constant monitoring of the territorial zone defined around the aircraft will be maintained. Also at this scan rate, upon any intruder aircraft being sensed, the appropriate lights of display panel 45 will appear to be continuously lit.

Figure 3:
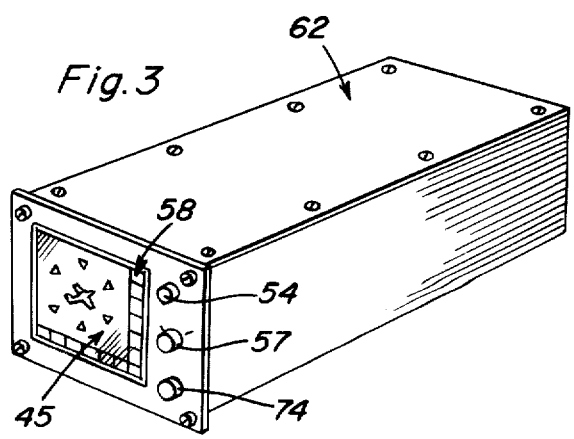
FIG. 3 is a perspective view of the display and control module which is positioned within the cockpit of an aircraft equipped with the collision avoidance system of the present invention.

FIG. 3 shows the appearance of the completed control module for the collision avoidance system. The module, labelled 62 is approximately 3 inches high by 4 inches wide by 12 inches deep and can accommodate all of the circuitry necessary for the system. The front face of the module contains the display and control panels depicted in FIG. 4 and is of such a size to be readily accessible by the pilot of the aircraft. The module is placed in the cockpit of the aircraft and is capable of being retrofitted easily in existing aircraft due to its small size.

Also incorporated in module 62 is the error monitoring circuitry for the system, shown in FIG. 6. The error monitoring circuitry includes a power up test module 64 which causes initialization of a test sequence through test sequence module 66 upon actuation of power within the aircraft. Test sequence module 66 sequences the instructions stored in test instruction set 68 which sends selective input signals to the various components of the collision avoidance system. The outputs of the components are sensed by the test response monitor 70 which compares these outputs against an appropriate stored signal indicative of the proper response of the tested element. The test response monitor 70 is connected to test logic 72 which activates display 45 in an approporiate manner as will be described. The test response monitor 70 also is connected to test sequence module 66 to provide an indication thereto of the termination of the previous element test, causing test sequencer 66 to sequence test instruction set 68. A manual switch 74 is available in the aircraft cockpit to cause manual actuation of the test sequence.

In operation, seven major functions are tested and monitored as follows:
1. transmitter section test
2. receiver section test
3. scanner drive synchronizer
4. data storage test
5. transmit sequencer test
6. receive sequencer test
7. display test As each test is performed, the appropriate corresponding numeral of numerical indicator 76, shown in FIG. 4, is lit through test logic 72. After all seven tests have been performed, the seven indicator lights are extinguished, except for the lights indicative of areas in which faults have been detected.

Upon initialization of the text sequence module 66, through either a momentary operation of manual switch 74 or through a pulsed input signal from power up test module 64, the test sequence module causes test instruction set 68 to output appropriate test signals to the transmitter section, including oscillator 24 and modulator 26. Appropriate testing to be used could include, for instance, initialization of the oscillator 24 output and sensing of that output, also, a preprogrammed modulation signal could be supplied to modulator 26 with the sensing of the modulator output indicating the operative condition of the modulator. Any other combination of test signals as would be apparent to one of ordinary skill in the art may also be used. The test signal outputs are received by test monitor 70, which causes test logic 72 to illuminate the numeral 1 on the numeric display 76 during the transmitter section test. Test monitor 70 compares the outputs with appropriate stored parameters and provides an indication to test logic 72 if a fault is found. After the comparison, test response monitor 70 causes test sequence module 66 to sequence the instruction set 68 causing similar testing of the receiver section with attendant illumination of the numeral 2. Test response monitor 70 is capable of individual response to each of the components of the system in this manner with the appropriate test signals to be used being readily apparent to one of ordinary skill in the art. At the end of the test sequence, if no errors are found, the seven numerical indicators extinguish and the system returns to normal operation. If, however, the test results in the system or subsystem failure, the lamp which indicates the test mode under which the failure occurred remains illuminated. Optionally, if the failure is minor, the system will continue to note the failure but will return to the normal operation mode. If the failure is major, the test network will shut the warning system down and indicate a major failure.

Accordingly, it can be seen that the aircraft collision avoidance system of the present invention provides an aircraft with a territorial safe zone which is actuated and maintained about the aircraft and which, when entered by another similarly equipped aircraft will provide both aircraft with digital aircraft configuration information which causes reciprocal displays as to the relative position of the two aircraft. The pilots of the respective crafts can, through established practices and regulations, evaluate their own display and navigate their aircrafts to safety. It will also be noted that each aircraft avoidance system is capable of detecting and displaying more than one aircraft simultaneously. Further, the system is equipped to insure against inadvertent system warning displays due to faults in the system itself. The system is equipped with an error testing and monitoring circuit which can test and monitor each individual element of the circuit and does so automatically upon the system start up and also can be run through a test sequence upon manual intervention of the pilot. The system test sequence takes a minimum time, approximately one second, thereby providing a minimum of degradation in system performance while the test sequence is being run.

Furthermore, the system is useful in providing a warning of stationary objects which are in dangerous proximity to the equipped vehicle. By providing a stationary object, such as a mountain peak, with an appropriate transmitter, the vehicle would be capable at ascertaining the relative location of the object in order to properly avoid it. Also, separate coded signals can be used to give an indication of the type of object being approached. For instance, a coded signal indicating "mountain peak" can be transmitted from the peak and decoded in the vehicle thereby giving an indication of both the relative location and type of obstacle present. Since these transmitters require a minimum of power, the energy for their operation can be inexpensively obtained with the use of present solar technology.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A collision avoidance system for providing a territorial safe zone about a vehicle for giving an indication when such vehicle approaches within a predetermined minimum distance of a obstacle or another similarly equipped vehicle, comprising:
    first transmitter means mounted on said obstacle for transmitting coded signals;
    antenna means associated with each vehicle comprising a plurality of antennae positioned at various points about each vehicle exterior, each antenna being adapted to transmit and receive signals;
    second transmitter means associated with each vehicle for transmitting a unique coded signal through each one of said antennae with such unique coded signal being indicative of the zone covered by its associated antenna;
    receiver means associated with each vehicle for receiving transmitted signals from said first transmitter means or from a second transmitter means on another similarly equipped vehicle;
    logic means associated with each vehicle for decoding received signals and providing an output based upon said decoded signal and the position of the antenna upon which the signal was received; and
    display means associated with each vehicle for displaying said output.

2. The system of claim 1 wherein each antenna is a directional antenna having a radiation pattern defining a zone about said vehicle, with such zones being established in three orthogonal axes about said vehicle.

3. The system of claim 2 wherein said receiver means includes a sensitivity control means for reducing the sensitivity thereof when said vehicle is in the vicinity of known obstacles.

4. The system of claim 2 and further including a transmitter scanner means for sequentially connecting each of said antennae to said second transmitter.

5. The system of claim 4 and further including a receiver scanner means for sequentially connecting each of said antennae to said receiver means.

6. The system of claim 5 and further including a scanner drive synchronization means for synchronizing the sequencing of said transmitter scanner and said receiver scanner.

7. The system of claim 6 wherein said transmitter means includes a carrier signal generator for generating a carrier signal, a modulator for modulating said carrier signal, a data storage means for storing a digital representation of each of said unique signals, and means for providing each of said digital representations to said modulator for modulating said carrier signal.

8. The system of claim 7 wherein said means for providing is controlled by said scanner drive synchronization means, said scanner drive synchronization means synchronizing the outputting of each digital representation with said transmitter scanner operation.

9. An aircraft collision avoidance system for providing an indication of the relative position of any two interferring aircraft, when such aircraft come within a predetermined range of one another, wherein each aircraft includes in combination:
    a plurality of directional, transmit/receive antennae mounted on the aircraft, each antenna defining a separate zone about the aircraft;
    transmitter means for transmitting through each of said antennae a coded signal which is unique to that antenna;
    receiver means attached to each of said antennae for receiving through the antennae, transmitted coded signals from said other interferring aircraft; and
    logic means for decoding said received signals for providing an indication of the zone on the other aircraft from which the received signal originated.

10. The system of claim 9 and further wherein said logic means including means for determining which of the antennae receive the decoded signal.

11. The system of claim 10 and further including a transmitter scanner means for sequentially connecting each of said antennae to said transmitter means.

12. The system of claim 11 and further including receiver scanner means for sequentially connecting each of said antennae to said receiver means.

13. The system of claim 11 and further including a test and monitoring means for providing test signals to said system and monitoring the response to said test signals for indicating the presence of a fault in said system.

14. The system of claim 13 wherein said test and monitoring means includes manual actuation means for manually commanding a test of said system.

15. The system of claim 13 wherein said test and monitoring means includes a power up actuation means for commanding a test of said system upon the initialization of power in said aircraft.

* * * * *